United States Patent Office 2,984,460
Patented May 16, 1961

2,984,460
COMBINED HEATING AND COOLING SYSTEM

Donald B. Gardner, Mount Prospect, and Maurice H. Hofmeister, Park Ridge, Ill., assignors to Bell & Gossett Company, Morton Grove, Ill., a corporation of Illinois Filed May 21, 1956, Ser. No. 586,192
4 Claims. (Cl. 257—297)

Our invention relates to a combined heating and cooling system employing water as the transfer medium for both types of conditioning.

One object of the invention is to provide a systemic hookup in which the heating and cooling sources have at least a common supply connection to the devices which condition the spaces being serviced, and may have either common or separate return connections from such devices.

A further object is to provide a combined system of the character indicated in which the transfer medium is moved by one or more pumps under manual or automatic control and including an automatic shift from heating to cooling and vice versa.

A further object is to provide a combined system as above in which the common supply and return connection to and from the space units takes the form of a mixing tank which is forced circulatingly connected to the "hot" and "cold" sources and also forced circulatingly connected to the space units with accompanying economies in pump sizes and operating costs for the several subportions of the system.

These and further objects of the invention will be set forth in the following specification, reference being had to the accompanying drawings, and the novel means by which the objects are effectuated will be definitely pointed out in the claims.

Figures 1, 2:
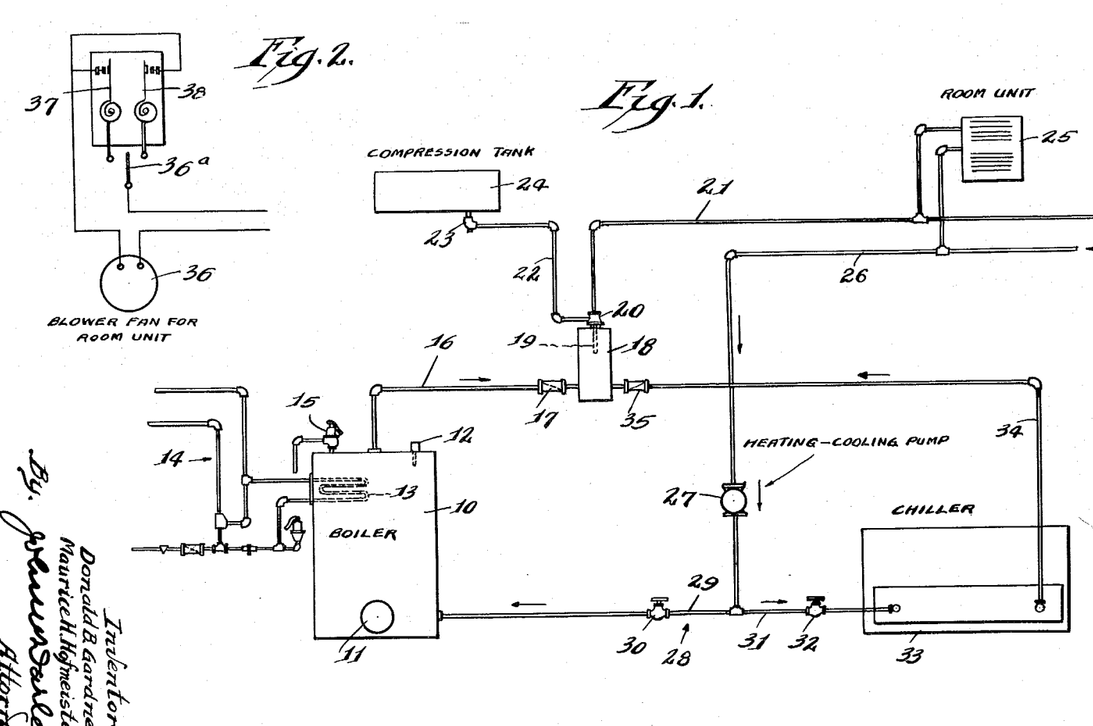
Fig. 1 is a schematic layout of one form of the combined system in which a single pump is employed for the heating and cooling cycles, and including year round provision for heating service or spigot water.
Fig. 2 is an electrical circuit diagram showing the dual thermostatic control for the blower fan of the space or room servicing unit in Figs. 1, 3, 6 and 8.

Referring to Fig. 1 which shows a simple combined system in which the shift between heating and cooling is under manual control, the numeral 10 designates a conventional, hot water boiler which is preferably automatically fired by a firing unit 11, hereinafter referred to as a burner, employing fluid or solid fuels and controlled by a suitably connected, immersion type thermostat 12 of conventional type. This thermostat maintains a temperature of the boiler water above a determined minimum such that there is always available a supply of hot spigot water through the medium of a heat exchanger 13 immersed in the boiler water and externally connected through a pipe network, generally indicated by the numeral 14, with the service outlets. The boiler 10 also carries a conventional pressure relief valve 15.

Leading from the boiler 10 is a hot supply pipe 16 which includes a valve 17 that is actuated to open by pump pressure in the pipe 16 and closed by gravity when the pressure is interrupted, valves of this type being hereinafter referred to as flow control valves. The delivery end of the pipe 16 connects with a tank 18 through whose upper end extends a dip tube 19 that connects through a fitting 20 with a supply pipe 21. Preferably, the fitting 20 is of the type shown in U.S. Letters Patent No. 2,500,621, dated March 14, 1950, in that the dip tube 19 and pipe 21 are directly connected for the passage of substantially bubble free water to the latter pipe, while through a separate passage in the fitting 20 air liberated in the upper portion of the tank 18 flows through a pipe 22 to a fitting 23 mounted in the lower side of a compression tank 24. The fitting 23 is preferably of the type shown in U.S. Letters Patent No. 2,395,697, dated February 26, 1946, in that the fitting accomplishes a free flow of air to the compression tank.

Any number of space or room units 25 are bridged between the supply pipe 21 and a return pipe 26, or the so-called, single pipe system may be employed in which the room units would have their inlet and outlet pipes connected to the pipe 21 that would be continued to form the pipe 26. In the latter case, connections of the units 25 to the supply pipe 21 would be through fittings of the type shown in U.S. Letters Patent No. 1,663,271, dated March 20, 1928. The return pipe 26 includes a motor driven pump 27 and connects with a pipe 28 having a branch 29 leading to the lower part of the boiler 10 and including a manually controlled valve 30, and a branch 31 leading to the casing of a chiller or evaporator 33 and including a manually controlled valve 32. The outlet pipe 34 from the chiller 33 connects through a flow control valve 35, similar to the valve 17, with the tank 18. The chiller 33 is of generally conventional type in that its coil (not shown) is connected in the usual refrigeration system and water delivered by the pipe 31 flows over this coil for chilling.

For the heating cycle, the valve 32 is closed and the pump 27 started in the usual manner. Hot water flow is then from the boiler 10 and successively through the pipe 16, tank 18 and pipe 21 to the room unit or units 25, while the return is successively through the pipe 26, pump 27 and pipe branch 29 to the boiler. During this period, the valve 35 is closed by gravity and the chiller 33 is out of operation.

Shifting to the cooling cycle is accomplished by closing the valve 30 and opening the valve 32 whereupon the room unit 25 is connected to the chiller 33 and the flow control valve 17 is gravity closed, the refrigeration system including the chiller 33 being placed in operation in the conventional manner. To protect the chiller 33 and the associated compressor (not shown), it is recommended that the temperature of the water in that part of the system between the tank 18 and the pump 27, considered with reference to the direction of flow, be permited to cool below 100° F. before shifting to the cooling cycle. A convenient determination of this lowered temperature may be made by means of a thermometer mounted in the tank 18.

The room unit 25 is of the conventional convector or radiator type and is equipped with a motor operated, blower fan 36 (see Fig. 2) which is arranged for electrical connection through a manual switch 36ª with "hot" and "cold" thermostats 37 and 38, respectively, exposed to the air in the space being serviced, both being shown in the open position. Depending on the time of year, the switch 36ª is moved one way or the other for "off" and "on" relation to the thermostats 37 or 38. With thermostatic control on the fan 36, it is contemplated that the pump 27 would operate constantly during either cycle.

Figure 5:
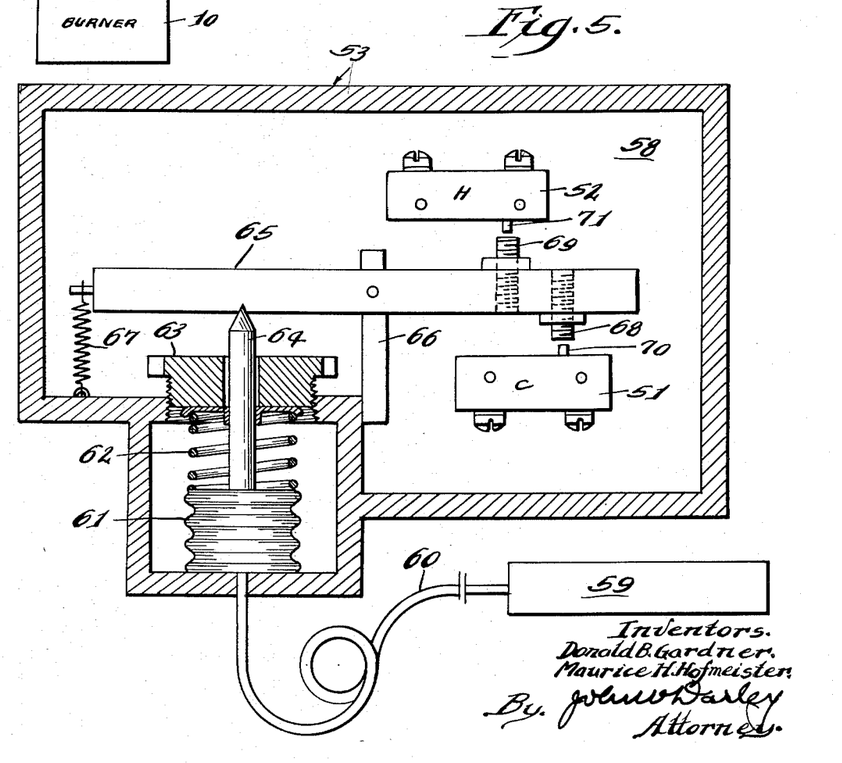
Fig. 5 is a sectional elevation of a two position, outdoor type of bulb thermostat for effecting an automatic shift between heating and cooling in the systems shown in Figs. 3, 6 and 8.

The Fig. 1 system is the simplest of the several modifications with respect to components required, only one pump being used and a single compression tank insures air removal from the system under either condition of operation. Further, the tanks 18 and 24, room unit 25 and pump 27 are common to both cycles. Automatic control may be provided by substituting electrically operated valves for the manual valves 30 and 32 and controlling such valves by an outdoor bulb control which determines the shift between the hot and cold cycles. This control is shown in Fig. 5 and will be described in connection with the Fig. 3 system.

Figure 3:
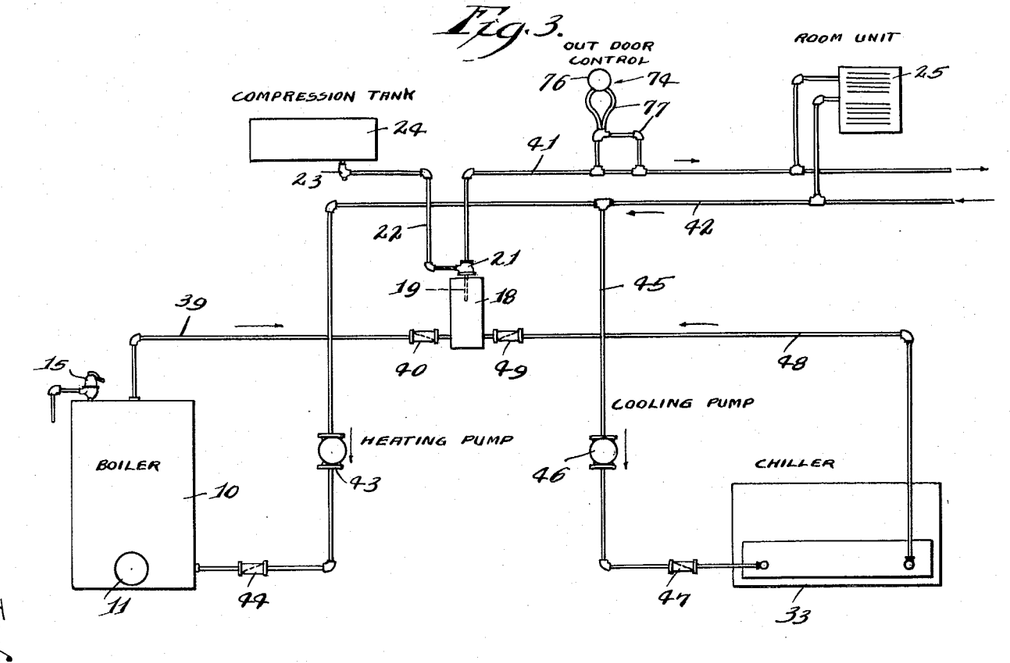
Fig. 3 is a schematic layout of a modified system employing separate pumps for the heating and cooling cycles which are automatically controlled in response to outdoor weather to effect a shift from one cycle to the other.

Referring to Fig. 3 the parts which have functions like the comparable parts in Fig. 1 are designated by the same numerals, namely, the boiler 10, tanks 18 and 24, room unit 25, and the allied air separation details 19, 20 and 23. A hot supply pipe 39 including a flow control valve 40 connects the boiler 10 with the tank 18 and connected to the dip tube 19 is a supply pipe 41 having inlet connection with the room unit 25 whose outlet connects with a return pipe 42 leading to the bottom of the boiler 10 and successively including in the direction of flow a motor driven, heating pump 43 and a flow control valve 44 to thus complete the heating circuit of which a part is common to the cooling circuit.

The non-common part of the latter circuit includes a return pipe 45 which connects with the return pipe 42 at a convenient point short of the intake of the heating pump 43, and the pipe 45 successively includes in the direction of flow a motor driven, cooling pump 46 and a flow control valve 47 and terminates in the chiller 33. From the latter leads a cold supply pipe 48 including a flow control valve 49 to the tank 18.

Except for the use of separate pumps 43 and 46 and as far as cycle flow is concerned, the Fig. 3 system is like that shown in Fig. 1. The principal distinctions in the Fig. 3 system are two controls, one of which insures that, through control of the burner 11, when the time for shifting from heating to cooling approaches, the temperature of the water in the service or room unit part of the system including the tank 18 will have been reduced sufficiently, as suggested above, to permit safe flow through the chiller 33, and the other control provides for shift from one pump operation to the other. Both of these controls are responsive to outdoor temperatures. Air removal by the fittings 20 and 23 is accomplished as described for Fig. 1.

Figure 4:
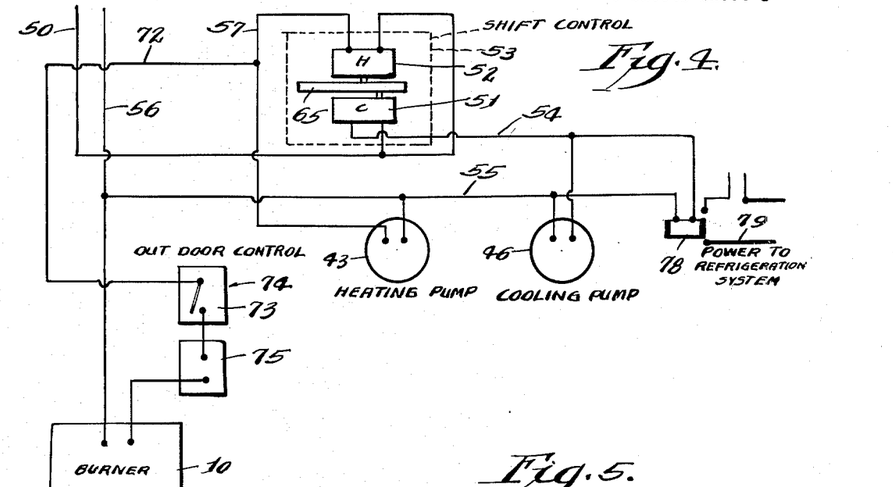
Fig. 4 shows the electric controlling circuit for use with the system shown in Fig. 3.

Referring to Fig. 4 which shows the electrical circuit for the Fig. 3 system, the numeral 50 designates a hot power wire which connects with one terminal each of so-called microswitches 52 and 51 of the snap acting type which are respectively tied in with the heating and cooling sides of the system as presently described. In the present instance, these switches are biased to an open position and require only a very small movement for closure and after the closing pressure is removed, the switch in question returns to an open position. Switches of this type are well known and a characteristic arrangement is disclosed in U. S. Letters Patent No. 1,960,020, dated May 22, 1934. The switches 51 and 52 form part of a shift control 53, more particularly shown in Fig. 5 and to which reference will be presently made, and which determines operation of either switch and of the pumps 43 and 46 in accordance with outside temperature conditions.

The other terminal of the "cold" switch 51 connects with the motor of the cooling pump 46 and this motor in turn connects by wire 55 with the ground power wire 56. Similarly, the other terminal of the "hot" switch 52 connects by wire 57 with the motor of the heating pump 43 and this motor in turn connects with the wire 55 and hence with the ground power wire 56.

Referring to Fig. 5, the shift control 53 includes a suitable casing 58 and a bulb 59 which is exposed to outdoor temperature and connects by a capillary tube 60 with a bellows 61 appropriately positioned within the casing 58 and loaded by a spring 62 as determined by an adjusting plug 63 threaded in an internal wall of the casing 58. The bulb 59, tube 60 and bellows 61 are filled with any of the fluids commonly used in the bulb type of control and whose expansion and contraction determine axial movements of the spring end of the bellows. One end of a stem 64 has abutting relation to the movable end of the bellows 61, extends freely through the plug 63 and has its opposite end in constant contact with a lever 65 intermediately pivoted on an arm 66. Contact of the lever 65 with the stem 64 is maintained by a spring 67 extending between one end of the lever and the casing 58. The other end of the lever 65 carries adjustable screws 68 and 69 extending from opposite sides thereof and operably related to actuating pins 70 and 71 forming parts of the "cold" and "hot" switches 51 and 52, all respectively. In Figs. 4 and 5, the switches 51 and 52 are shown in open position and it will be apparent that, as determined by the temperature incident on the bulb 59, either of the switches will be closed to start the associated pump, or both of the switches 51 and 52 may be open as the lever 65 releases one switch for opening and begins moving towards a closing position for the other switch. During this twilight period, neither pump operates and this phase of the operation constitutes one factor in insuring the desired reduction in water temperature when the shift is from heating to cooling.

Referring back to Fig. 4 to complete the electrical circuit, a wire 72 connects the wire 57 with one terminal of the electrical control for the burner 10 whose other terminal connects with the ground wire 56. Forming part of the wire 72 and in series relation are the switch 73 of an outdoor control 74 (see Fig. 3) and an immersion type thermostat 75 which is mounted in the boiler 10 and acts in the usual way as a high limit on the boiler water temperature, the switch 73 and thermostat 75 being in parallel with the heating pump 43.

For details of the control 74, reference may be had to U.S. Letters Patent Nos. 2,626,755 and 2,668,216, dated January 27, 1953 and February 2, 1954, respectively. Briefly, the control 74 includes a heat conducting tube 76, shown schematically in Fig. 3, which is exposed at one end to outdoor weather and has its opposite end bathed by hot water during the heating cycle which is tapped off the supply pipe 41 by the pipe network generally indicated by the numeral 77, also shown in Fig. 3. The mutually modifying actions of the different temperatures on the ends of the tube 76 produce corresponding changes in the length of the tube which affect the switch 73 (see Fig. 4) constituting the electrical portion of the control 74 and which switch may be patterned after that shown in the above referred to Patent No. 1,960,020. The outdoor control 74 as a concomitant of its operation provides a second factor in insuring a sufficient cooling of the system water before a shift to the cooling cycle as will be apparent from the following description of the system's operation.

For convenience, winter operation will first be considered. In this phase, the shift control 53 will have its "hot" switch 52 closed so that the heating pump 43 is running to circulate hot water through the room unit 25, the "cold" switch 51 being open so that the cooling pump 46 is out of operation and hot water cannot flow through the chiller 33 since the flow control valves 47 and 49 are closed. In addition, the "cold" outdoor temperature has caused the outdoor control 74 to close its switch 73 so that the burner 10 is operating. Thereafter and as long as the outdoor temperature is such as to demand heating, i.e., "hot" switch 52 closed, the outdoor control 74 will control the burner to match the heating system temperature to the demand set up by variations in the outdoor temperature. This burner control may include periods when the burner 10 is out of action, i.e., an opening of the switch 73, but the heating pump 43 continues to run.

With the approach of warm weather, the intervals between burner operation lengthen and the time of each such operation may shorten so that the temperature of the water in the system decreases until it is low enough to be circulated through the chiller circuit when the shift control 53 through its "cold" switch 51 starts the cooling pump 46. With the opening of the "hot" switch 52, the heating pump 43 and the burner 10 cease operation and, thereafter, the space being serviced by the room unit 25 is cooled under the control of the thermostat 38 (see Fig. 2). Coincident with the closing of the "cold" switch 51, a relay 78 connected to the wires 54 and 55 is energized to close a power circuit to determine in the usual way operation of the refrigerator compressor and the conventional controls associated therewith. The refrigeration system is entirely out of action during the heating cycle.

There may be times when both pumps are not operating depending upon the outdoor transitional conditioning of the controls 53 and 74 between the heating and cooling cycles and there may be other times when daytime operation requires cooling followed by heating during the cooler night period. The shift between the cycles is entirely automatic in either direction.

Figure 6:
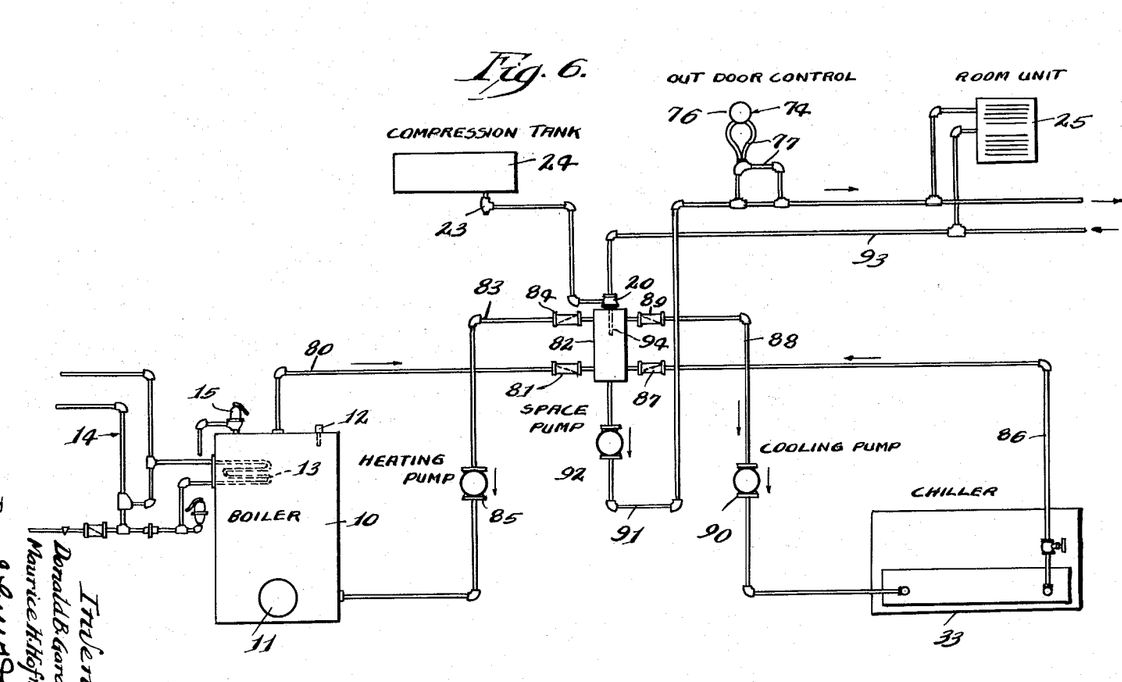
Fig. 6 is a schematic layout of a further system modification characterized by the use of three pumps for respectively establishing a forced circulation between a common mixing tank, and the heat source, the cold source and the space or room units.

In Fig. 6 is shown a still further modification which is characterized by the employment of three pumps and in which the system will be analytically considered as including three circuit components which are tied together by a common member termed a mixing tank. The components include "hot" and "cold" circuits wherein flow therethrough is automatically controlled to supply "hot" or "cold" water to the mixing tank, and a space circuit in which flow between the room units and mixing tank is also automatically controlled.

Specifically and referring to Fig. 6 in which elements common to Figs. 1 and 3 are designated by the same numerals, a supply pipe 80 leads from the upper part of the boiler 10, includes a flow control valve 81 and connects with the lower part of a mixing tank 82 and from the upper part of this tank water is returned to the boiler by pipe 83 which successively includes in the direction of flow a flow control valve 84 and a heating pump 85. The parts just described constitute the heating circuit component of the combined system.

A supply pipe 86 leads from the chiller 33, includes a flow control valve 87 and connects with the bottom of the mixing tank 82 and return from the upper part of the tank to the chiller is through a pipe 88 which successively includes in the direction of flow a flow control valve 89 and a cooling pump 90. The parts just described constitute the cooling circuit component of the combined system.

For the space circuit, a supply pipe 91 including a space pump 92 connects with the inlet to the room unit 25 whose outlet connects with a return pipe 93 that terminates in a dip tube 94 extending within the mixing tank 82. Air removal through the medium of the fittings 20 and 23 is identical with that discussed in connection with Fig. 1.

The Fig. 6 system also includes provision for supplying hot service water at all times in the same manner as shown in Fig. 1. Accordingly, the burner 11 is controlled as to a minimum temperature of the boiler water by the thermostat 12 and immersed in the boiler water is a heat exchanger 13 which is externally connected to service outlets by the pipe network 14 in the usual manner.

So far as described, it will be understood that the heating pump 85 circulates water only between the boiler 10 and mixing tank 82, the cooling pump 90 circulates water only between the chiller 33 and the mixing tank 82, and the space pump 92 only circulates water between the mixing tank and the room unit 25. This system is characterized by flexibility and economy of operation and better specific control in that the respective pumps can be sized to handle their several heads. For example, it is desirable that the flow rate in the portion of the system between the mixing tank 82 and room units 25 should not exceed a certain maximum, about four feet per second, to avoid objectionable noise, while a higher velocity is preferred through the chiller since it enables a reduction in heat transfer surface in the coil of the latter unit an a lower cost thereof. A typical installation employed motors of $\frac{1}{12}$ hp. for the heating pump 85 and $\frac{1}{3}$ hp. each for the cooling and space pumps 90 and 92, respectively. Further, it is desirable that flow through the boiler portion of the system should be equal to or greater than that through the room unit portion.

Figures 7, 9:
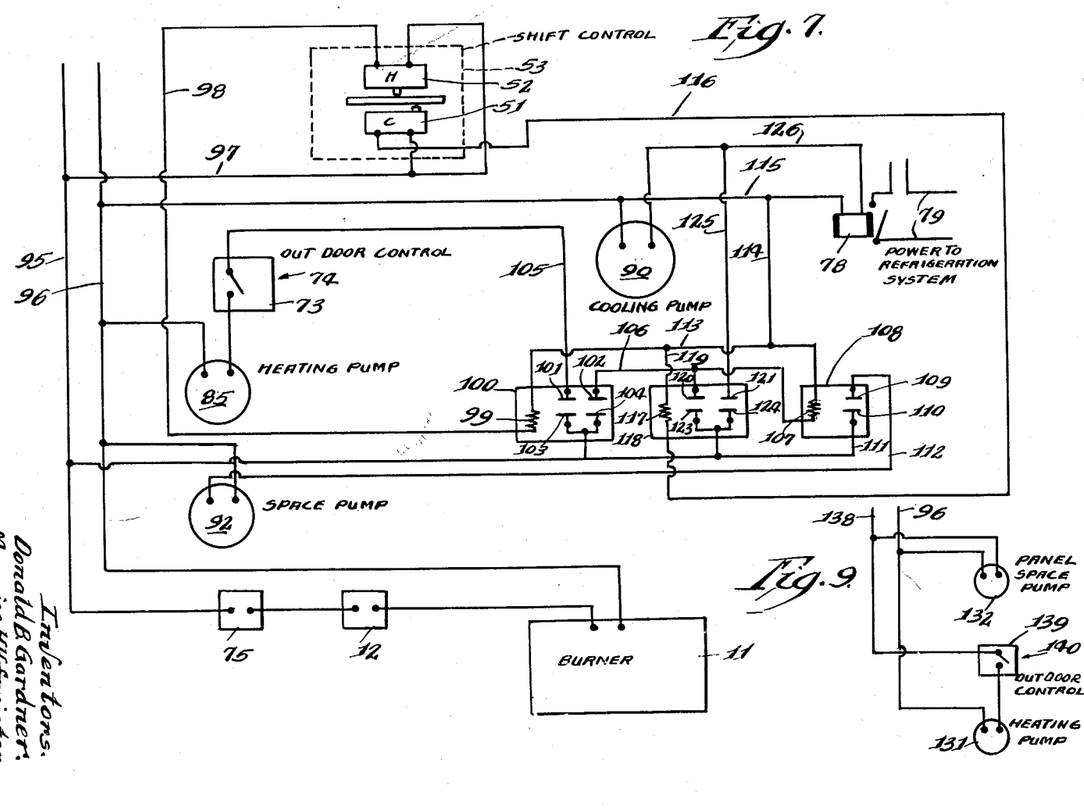
Fig. 7 shows the electric controlling circuit for use with the system shown in Fig. 6.
Fig. 9 shows the electrical controlling circuit which is tied in with the electric circuit shown in Fig. 7 for use with the system shown in Fig. 8.

Also forming part of the Fig. 6 system and tied into the supply pipe 91 leading to the room units 25 in the same manner as in Fig. 3 as far as water flow is concerned is the outdoor control 74 including the heat conducting tube 76 and pipe network 77. The control circuit for the Fig. 6 system is shown in Fig. 7 to which reference will now be made.

A hot power wire 95 including the thermostats 75 and 12, respectively, connects with the burner 11 which also connects with a ground power wire 96. Hence, the boiler always contains a supply of hot water to meet the demands of the pipe network 14 and the room units 25, or the network alone depending upon the time of the year.

A wire 97 connects the power wire 95 with one terminal each of the "cold" and "hot" microswitches 51 and 52, respectively, forming part of the shift control 53. The other terminal of the switch 52 connects by wire 98 with a coil 99 forming part of a double pole, single throw relay 100 including the contacts 101 and 102 which are respectively engaged by the contacts 103 and 104 when the coil 99 is energized. A wire 105 including the switch 73 of the outdoor control 74 and the motor of the heating pump 85 connects the contact 101 with the ground wire 96 to complete the circuit through the last named pump.

The contact 102 connects by wire 106 with a coil 107 forming part of a single pole, single throw relay 108 including the contacts 109 and 110 which are engaged when the coil 107 is energized. The contact 110 connects by wire 111 with the hot power wire 95 and also connected to the wire 111 are the contacts 103 and 104 of the relay 100, while the contact 109 connects by wire 112 through the motor of the space pump 92 with the ground wire 96. The coils 99 and 107 have a common connection through wire 113 which connects by wires 114 and 115 with the ground wire 96. Accordingly and assuming winter operation, when the coil 99 is energized, not only is the heating pump 85 placed in operation by engagement of the contacts 101 and 103, but simultaneously therewith the engagement of the contacts 102 and 104 energizes the coil 107 to close the contacts 109 and 110 and place the space pump 92 in operation. Hence, the relay 100 determines operation of the relay 108 subject to the position of the "hot" switch 52, but so long as the latter is closed, the heating pump 85 may stop due to opening of the switch 73 of the outdoor control 74 without affecting the space pump 92 which continues to run.

For the cooling side of the system, the other terminal of the "cold" switch 51 connects by wire 116 with a coil 117 forming part of a double pole, single throw relay 118 and the coil 117 in turn connects by wire 119 successively through wires 113, 114 and 115 with the ground wire 96. The relay 118 includes contacts 120 and 121 which are respectively engaged by the contacts 123 and 124 when the coil 117 is energized. The contacts 123 and 124 connect with the wire 111 and hence with the hot wire 95, while the contact 120 connects with the wire 106 and hence with the coil 107. The contact 121 connects by wire 125 through the motor of the cooling pump 90 and the wire 115 with the ground wire 96. The wire 115 and a wire 126, connected to the wire 125, tie in with the relay 78 for determining power flow through the wires 79 and the operation of the refrigeration system.

Hence and assuming summer operation and closure of the switch 51, the energization of the coil 117 closes the contacts 121 and 124 to start the cooling pump and the refrigeration system, while closing of the contacts 120 and 123 energizes the coil 107 to close the contacts 109 and 110 and start the space pump 92. When the cooling pump 90 stops, as by opening of the "cold" switch 51, the space pump 92 also stops. Accordingly, the relay 118 determines operation of the relay 108 subject to the position of the "cold" switch 51.

The Figs. 3 and 6 systems are alike with respect to operation of the shift control 53 in conditioning the system for hot or cold operation, but differ in their effect on hot operation. In Fig. 3, when the "hot" switch 52 is closed, the heating pump 43 runs continuously and control on the heat input by the boiler 10 is exercised by the outdoor control 74 on the burner 10. However, in Fig. 6 wherein the boiler 10 is arranged for year round operation to provide hot service water under control of the thermostat 12, when the "hot" switch 52 is closed, operation of the heating pump 85 is determined by the outdoor control 74 in accordance with outdoor weather and the heating demand of the building.

Figures 8, 10:
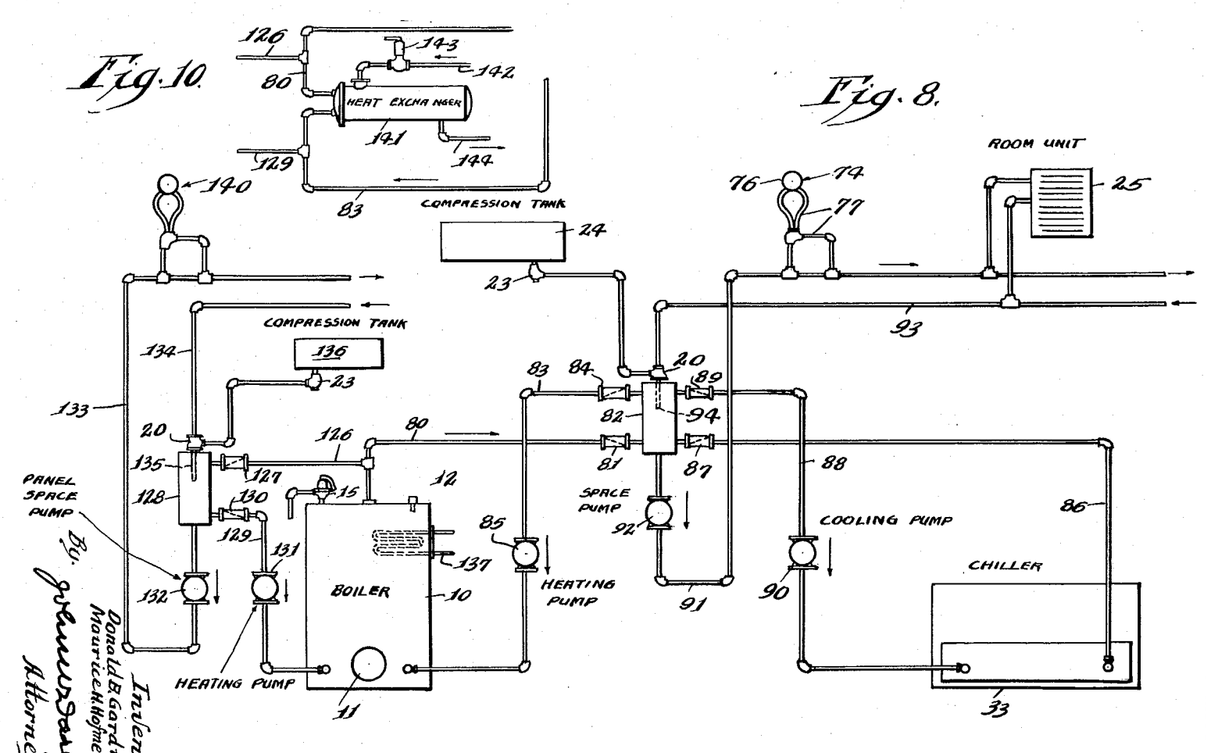
Fig. 8 is a schematic layout of a still further modified system which is identical with that shown in Fig. 6 plus the addition of a circuit for supplying heat to panel or radiant type of heaters.
Fig. 10 is a fragmentary view showing a steam supplied heat exchanger which would be substituted for the boiler in Fig. 8.

A still further modification is shown in Fig. 8 which includes the complete heating and cooling portions and control circuit therefor, respectively, as illustrated in Figs. 6 and 7, plus an additional portion for supplying heat to a so-called panel or grid type of heating circuit which is customarily embedded in a wall, floor or ceiling, or any combination thereof, of the space being serviced. Common parts in Figs. 6 and 8 are designated by like numerals.

Referring to Fig. 8, a supply pipe 126 including a flow control valve 127 connects the "hot" supply pipe 80 with a mixing tank 128 from which the water returns to the lower part of the boiler 10 through a pipe 129 which successively includes in the direction of flow a flow control valve 130 and a heating pump 131. Since the Fig. 8 system employs the control circuit shown in Fig. 7, the water temperature in the boiler 10 is maintained above a determined minimum by the thermostat 12 so that whenever the pump 131 operates, hot water is circulated through the mixing tank 128.

The hot water is withdrawn from the bottom of the mixing tank 128 by a panel space pump 132 which is included in a supply pipe 133 leading to the panel (not shown) and return from the latter is through a pipe 134 which terminates in a dip tube 135 extending within the mixing tank 128. Air freed in this tank collects in a compression tank 136 through the medium of the fittings 20 and 23 as above described. A heat exchanger 137 for supplying hot service water may also extend within the boiler 10.

The control circuit for the Fig. 8 system is the same as that shown in Fig. 7 plus the addition illustrated in Fig. 9 to which reference will now be made. A wire 138 connects the wire 105 (see Fig. 7) on the input side of the outdoor control switch 73 with the motor of the heating pump 131 which in turn connects with the ground wire 96. Included in the wire 138 is the switch part 139 of an outdoor control, generally indicated by the numeral 140 (see Figs. 8 and 9), which is functionally identical with the control 74 and flow connected to the pipe 133 in the same manner. Hence, during closure of the "hot" switch 52, the switch 139 will determine operation of the heating pump 131 in accordance with the action law of the outdoor control 140 as heretofore explained for the comparable control 74. The panel space pump 132 connects with the power wires 138 and 96, respectively, and runs continuously during closure of the "hot" switch 52. From the foregoing, it will be apparent that, depending upon outdoor weather and the heat load of the space being serviced, the heating pump 131 may run continuously or intermittently.

The Fig. 8 system is also fully automatic and provides in one arrangement capacity for satisfying the heating and cooling requirements of one space and the heating demands of another space, both utilizing one boiler only.

The system shown in Fig. 8 may be modified to employ steam as a source of heat and wherein, referring to Fig. 10, a heat exchanger 141 would be substituted for the boiler 10 and burner 11. Steam from any source is supplied through a pipe 142 including a reducing valve 143 to the heat exchanger 141 and exhausts through a pipe 144. Supply and return pipes 80 and 83 (see Fig. 8) lead from and to the exchanger 141. The remainder of the system is identical with that shown in Fig. 8.

We claim:

1. In a heating-cooling system for a space having a space heat exchanger therein, the combination of a compression tank, a deaeration tank having liquid inlet means, liquid outlet means, and an air outlet, the latter being at the top thereof and being connected to said compression tank, a heating circuit for circulating heated liquid through said space heat exchanger comprising a closed circuit including in series said liquid inlet means, the deaeration tank, said liquid outlet means, the space heat exchanger and a heating tank having a heat exchanger therein adapted to be heated by a source of heat, a cooling circuit for circulating chilled liquid through said space heat exchanger comprising a closed circuit including in series said liquid inlet means, the deaeration tank, said liquid outlet means, the space heat exchanger and a cooling tank having a heat exchanger therein adapted to be cooled by a source of refrigeration, pump means for selectively moving fluid through either said heating circuit or said cooling circuit, said deaeration tank being interposed in both the heating and cooling circuits on the inlet side of said space heat exchanger, and said deaeration tank having a cross-sectional area substantially greater than the cross-sectional area of the said liquid inlet means for the deaeration tank, whereby during the operation of either the heating circuit or the cooling circuit the velocity of liquid entering the deaeration tank is substantially reduced to separate air from said liquid.

2. A heating-cooling system as set forth in claim 1 in which said liquid outlet means for the deaeration tank includes a dip tube which extends downwardly through the top of, and into the liquid within, said deaeration tank.

3. A heating-cooling system as set forth in claim 1 in which said liquid inlet means comprises two liquid inlets, one being in the heating circuit and the other being in the cooling circuit.

4. A heating-cooling system as set forth in claim 1 in which said deaeration tank is interposed in both the heating circuit and the cooling circuit not only on the inlet side of said space heat exchanger, but also on the outlet side thereof.

References Cited in the file of this patent

UNITED STATES PATENTS

| | | |
|---|---|---|
| 1,315,766 | Feldman | Sept. 9, 1919 |
| 1,980,688 | Lewis | Nov. 13, 1934 |
| 2,004,843 | Wilkes et al. | June 11, 1935 |
| 2,115,706 | Cornell | May 3, 1938 |
| 2,200,620 | Findley | May 14, 1940 |
| 2,255,292 | Lincoln | Sept. 9, 1941 |
| 2,469,616 | Tidd | May 10, 1949 |
| 2,555,012 | Spofford | May 29, 1951 |
| 2,650,031 | Hitch et al. | Aug. 25, 1953 |
| 2,713,973 | Hencken et al. | July 26, 1955 |
| 2,746,724 | Leach | May 22, 1956 |
| 2,751,152 | Ellenberger | June 19, 1956 |